United States Patent [19]

Wang et al.

[11] Patent Number: 4,672,670
[45] Date of Patent: Jun. 9, 1987

[54] APPARATUS AND METHODS FOR CODING, DECODING, ANALYZING AND SYNTHESIZING A SIGNAL

[75] Inventors: Bu-Chin Wang, Santa Clara; Shankar S. Narayan, Woodland Hills, both of Calif.

[73] Assignee: Advanced Micro Devices, Inc., Sunnyvale, Calif.

[21] Appl. No.: 517,537

[22] Filed: Jul. 26, 1983

[51] Int. Cl.⁴ .............................................. G01L 5/00
[52] U.S. Cl. ........................................ 381/47; 381/31; 381/36
[58] Field of Search ........................ 381/31, 36, 47; 375/122, 29-32

[56] References Cited

U.S. PATENT DOCUMENTS

| | | | |
|---|---|---|---|
| 3,750,024 | 7/1973 | Dunn et al. | 381/36 |
| 4,047,108 | 4/1977 | Bijker et al. | 381/31 |
| 4,538,234 | 8/1985 | Honda et al. | 381/31 |

OTHER PUBLICATIONS

*Digital Processing of Speech Signals*, by Lawrence R. Rabiner and Ronald W. Schafter, copyright 1978 by Bell Laboratories, Inc., published by Prentice-Hall, Inc., Englewood Cliffs, N.J., pp. 208-213, 226-228 and 239.

Primary Examiner—E. S. Matt Kemeny
Attorney, Agent, or Firm—Patrick T. King; Martin C. Fliesler; Stephen C. Durant

[57] ABSTRACT

In an ADPCM (Adaptive Differential PCM) system, in which the signal is commonly coded in $C_i$, $Q_n$, and $\sigma$ parameters, a lower sampling rate which normally causes distortion is made possible by deriving additional parameters $A_k$, $B_k$ as a function of the error (distortion) between the original signal $S_n$ and the sampled signal $Y_n$. The $A_k$, $B_k$ coefficients control a distortion filter at the receiver.

43 Claims, 6 Drawing Figures

APPARATUS AND METHODS FOR CODING, DECODING, ANALYZING AND SYNTHESIZING A SIGNAL

BACKGROUND OF THE INVENTION

1. Field of the Invention

The present invention relates generally to apparatus and methods for coding and decoding a signal and, more particularly, to apparatus and methods for analyzing and synthesizing analog speech signals.

2. Discussion of Background and Prior Art

Signals, and in particular analog speech signals, are coded for a wide variety of reasons. For example, for many applications, speech signal processing is a bandwidth limited process. Consequently, original analog speech signals typically are coded to compress the signals, i.e., to remove redundant information in the original speech signals that need not be processed in order to reconstruct the signals with quality. The compressed signals can then be, for example, transmitted over a communications data link that is bandwidth limited or stored in a memory of limited storage capacity and ultimately decoded to reconstruct the signals. In general, signal analysis is the overall process by which original signals are converted into compressed signals having most of the information carried in the original signals. Signal synthesis is the overall process used to reconstruct the original signals from the compressed signals.

Two commonly used digital coding techniques for compressing analog speech signals are (1) parametric coding and (2) waveform coding. One example of the parametric coding technique is linear predictive coding, in which the waveforms of the analog speech signals are modeled as the output of a filter which is excited by a linear combination of a "white noise" sequence and a quasi-periodic train of impulses, known as pitch pulses. That is, the parameters that are used to represent the analog speech signals are the values of the coefficients of the filter, the period of the pitch pulses, the amplitude of the pitch pulses and the energy of white noise, all of which can be transmitted or stored digitally. By using these parameters to represent the speech signals, the data rate or number of bits per second (bps), i.e., bandwidth, that is required for speech processing can be reduced significantly. For example, data rates as low as 800 to 2400 bps can be achieved using the linear predictive coding scheme. However, while the data rate is low, the quality of the speech signal reconstructed from these parameters also is undesirably low. The reconstructed speech is intelligible, but does not sound natural.

Waveform coding exploits the correlation between adjacent speech samples of the waveform as well as speech samples that are several samples apart to compress the signal. Generally, waveform coding involves sampling an analog speech signal, quantizing and analog-to-digital (A/D) converting the sampled signals, and then correlating the A/D converted signals, so as to transmit or store only those A/D converted signals having non-redundant information. For speech signals having a maximum frequency content of about 3.4 kHz, the sampling usually occurs at a rate of 8 kHz. As is known, the signal quantization and conversion occurs using waveform coders operating at high bit rates, e.g., 16-32k bits per second, to minimize the introduction of "quantization noise" or distortion into the waveform of the converted signals. A number of different waveform coding systems exist, including systems having waveform coders that employ Delta Modulation (DM), Adaptive Delta Modulation (ADM), Differential Pulse Code Modulation (DPCM), Adaptive Differential Pulse Code Modulation (ADPCM) and Vector Quantization (VQ). Waveform coding has the advantage of being able to reconstruct high quality speech, but at the expense of bandwidth requirements in the range of 16-32k bits per second or higher. At data rates below 16k bits per second, the quality of the reconstructed speech signal is poor. This results from the waveform coder operating at the lower bit rates to quantize and convert the analog signal, which introduces the quantization noise into the A/D converted speech signal.

SUMMARY OF THE INVENTION

It is an object of the present invention to provide novel apparatus and methods for coding and decoding an original signal.

It is another object of the present invention to provide novel apparatus and methods for analyzing and synthesizing an original signal.

Yet another object of the present invention is to substantially compress an original signal, while reconstructing the original signal from the compressed signal with high quality.

Additional objects, advantages and novel features of the invention will be set forth in part in the description which follows, and in part will become apparent to those skilled in the art upon examination of the following or may be learned of by practice of the invention. The objects and advantages of the invention may be realized and obtained by means of instrumentalities and combinations particularly pointed out in the appended claims.

STATEMENT OF THE INVENTION

To achieve the foregoing and other objects in accordance with the purposes of the present invention, as embodied and broadly described herein, one aspect of the invention is an apparatus for coding an original signal having a waveform, comprising means for coding the waveform at a rate to produce a coded signal having distortion, and means, responsive to the coded signal, for attenuating the distortion, the waveform coding means having first data and the attenuating means having second data for reconstructing the original signal.

Preferably, the attenuating means includes a filter having filter coefficients whose values are the second data. Preferably also, the means for coding the waveform is a waveform coder that is operative at a low bit rate, which introduces quantization noise or distortion into the coded signal.

In another aspect, the present invention is a method for coding an original signal having a waveform, comprising coding the waveform at a rate to produce a coded signal having distortion, providing first waveform coding data in response to the coding, attenuating the distortion of the coded signal, and providing second attenuation data in response to the attenuating, the first waveform coding data and the second attenuation data having information to reconstruct the original signal. Preferably, the step of attenuating comprises filtering the coded signal with a filter and the step of coding comprises coding the waveform at a low bit rate.

Other aspects of the present invention include apparatus and methods for decoding the above-mentioned data to reconstruct the original signal. Still other aspects of the present invention include overall apparatus that implement the coding and decoding principles indicated above to analyze and synthesize the original signal.

STATEMENT OF DERIVED BENEFITS AND ADVANTAGES

The present invention combines features of waveform coding and parametric coding to substantially compress an original signal, thereby reducing bandwidth requirements, while being able to reconstruct the original signal with high quality.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1A:
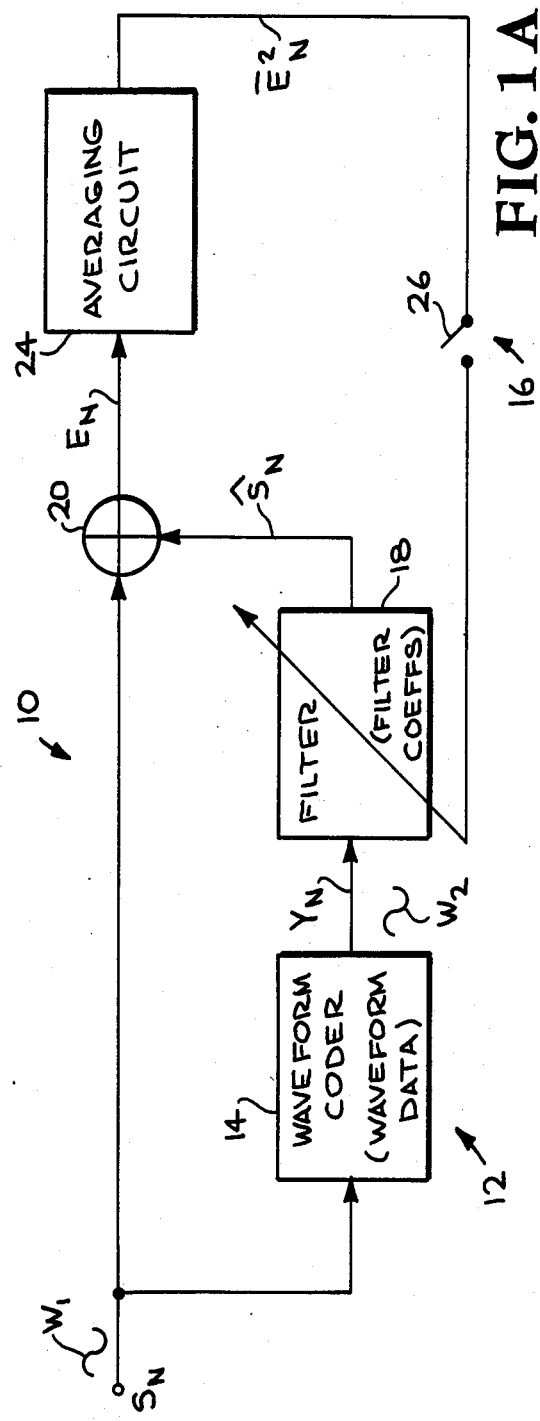
FIG. 1A is a simplified block diagram used to explain the signal coding principles of the present invention.

Fig. 1A illustrates an apparatus 10 for describing the general principles of coding an original input signal $S_N$ having a waveform $W_1$ to compress the signal. While the coding principles of the present invention can apply to a wide variety of input signals $S_N$, the present invention will be described in connection with an analog speech signal $S_N$ having, for example, a maximum frequency content of 3.4 kHz. The apparatus 10 includes means 12 for coding the waveform $W_1$ of the speech signal $S_N$ to produce a coded signal $Y_N$ having a waveform $W_2$. The waveform coding means 12 includes a conventional waveform coder 14 which can utilize any one of a plurality of waveform coding techniques, such as Delta Modulation (DM), Adaptive Delta Modulation (ADM), Differential Pulse Code Modulation (DPCM), Adaptive Differential Pulse Code Modulation (ADPCM) and Vector Quantization (VQ).

Normally, the waveform coder 14 can encode the speech signal $S_N$ without substantially introducing quantization noise or distortion into the coded signal $Y_N$ when it operates in the range of 16–32k bits per second. In accordance with the present invention, however, the speech signal $S_N$ is encoded to produce signal $Y_N$ by operating the waveform coder 14 at a low bit rate $\leq$ 16k bits per second, such as at 4.4k or 8.7k bits per second. As a result of this encoding at the low bit rate, the waveform $W_2$ of the coded signal $Y_N$ has information about the periodicity of the waveform $W_1$ of the signal $S_N$, but the short-time spectrum of the waveform $W_2$ of the coded signal $Y_N$ has distortion due to the quantization noise introduced by the waveform coder 14. Preferably, the waveform coder 14 uses the ADPCM method and A/D converts blocks of samples of the speech signal $S_N$ over respective frame times, as will be further described. For example, there can be 240 samples, at 12 bits per sample, in a frame time of 30 milliseconds with A/D sampling at 8 kHz.

Apparatus 10 also includes means 16 for attenuating the distortion that is introduced into the coded signal $Y_N$ by the waveform coder 14. Attenuating means 16 includes a spectral shaping filter 18 having $M+1$ filter coefficients, and preferably one that is adaptive, as will be further described. As one particular example, the adaptive filter 18 can be a conventional Finite Impulse Response (FIR) filter.

The output of the adaptive spectral shaping filter 18 is an attenuated speech signal $\hat{S}_N$ that is fed as one input to a summer 20 which receives as another input the original speech signal $S_N$. An error signal $E_N$, which is the difference between signal $S_N$ and signal $\hat{S}_N$, is produced at the output of summer 20 and then fed to an averaging circuit 24 to produce an averaged error signal $\overline{E}_N^2$. An on-off switch 26 is operated to sample the averaged error signal $\overline{E}_N^2$ at a frame time of, for example, 30 milliseconds. The sampled averaged error signal $\overline{E}_N^2$ is then fed to the adaptive spectral shaping filter 18. In response to the sampled averaged error signal $\overline{E}_N^2$, the $M+1$ filter coefficients of the adaptive spectral shaping filter 18 are varied for purposes of further filtering the distortion in the signal $Y_N$ and minimizing the error signal $E_N$.

Mathematically, apparatus 10 operates in accordance with the following equations.

The error signal $E_N$ is defined as follows:

$$E_N = S_N - \hat{S}_N \tag{1}$$

where $\hat{S}_N$ is defined as:

$$\hat{S}_N = \sum_{K=0}^{M} A_K Y_{N-K} \tag{2}$$

and the overall average of error signal $E_N$ over one frame time is equal to:

$$\overline{E}_N^2 = E\left[\left(S_N - \sum_{K=0}^{M} A_K Y_{N-K}\right)^2\right] \tag{3}$$

where $A_K$, $K = 0, 1, 2 \ldots M$, is the value of the Kth filter coefficient and $M+1$ are the number of filter coefficients of filter 18.

Consequently, the overall average of the error signal $E_N$ in one frame time of, for example, 240 samples as mentioned above, is the following:

$$\overline{E}_N^2 = \frac{1}{240} \sum_{i=1}^{240} \left(S_N - \sum_{K=0}^{M} A_K Y_{N-K}\right)^2 \tag{4}$$

Then, in order to minimize the signal $\overline{E}_N^2$, the derivative of the signal $\overline{E}_N^2$ with respect to the filter coefficients is taken as follows:

$$\frac{\partial \overline{E_N}^2}{\partial A_K} = 0; K = 0, 1, \ldots M \quad (5)$$

Upon this minimization, all the filter coefficients will have respective values $A_0, A_1, A_2 \ldots A_M$ such that the adaptive spectral shaping filter 18 will substantially filter the distortion in the coded signal $Y_N$.

Furthermore, as is conventional in filter design, all the values $A_0, A_1, A_2 \ldots A_M$ of the filter coefficients of the adaptive spectral shaping filter 18 can be identified by the following equation:

$$R_{YY}A = R_{YS} \quad (6)$$

where $R_{YY}$ are the auto-correlation components and $R_{YS}$ are cross-correlation components defined respectively as:

$$R_{YY}(K) = E(Y_N Y_{N-K}) \quad (7)$$

$$R_{YS}(K) = E(S_N Y_{N-K}) \quad (8)$$

All the values $A_0, A_1, A_2 \ldots A_M$ of the filter coefficients are given in matrix form as:

$$A = (A_0 \, A_1 \ldots A_M)^T \quad (9)$$

where T means transposed

And, in matrix form, the auto-correlation components $R_{YY}$ are given as:

$$R_{YY} = \begin{bmatrix} R_{YY}(0) & R_{YY}(1) & \ldots R_{YY}(M) \\ R_{YY}(1) & R_{YY}(0) & \ldots R_{YY}(M-1) \\ \cdot & & \\ \cdot & & \\ \cdot & & \\ R_{YY}(M) & R_{YY}(M-1) & \ldots R_{YY}(0) \end{bmatrix} \quad (10)$$

Similarly, the cross-correlation components $R_{YS}$ are given as follows:

$$R_{YS} = (R_{YS}(0) \, R_{YS}(1) \ldots R_{YS}(M))^T \quad (11)$$

As will be further described, the waveform coder 14 has certain waveform coding data and the filter 18 has filter coefficient data, i.e., the values $A_0, A_1 \ldots A_M$ of the M+1 filter coefficients, which can be transmitted or stored in memory (not shown) for use in reconstructing the speech signal $S_N$ with high quality, while employing a bandwidth limited system at low bit rates. As an alternative to transmitting or storing the filter coefficient data, the values $R_{YS}(0), R_{YS}(1) \ldots R_{YS}(M)$ of the cross-correlation components can be transmitted or stored, as will be described below. As will also be described below, the coding principles of the invention embodied in the apparatus 10 can be used to implement overall speech signal analysis and synthesis apparatus.

Figure 1B:
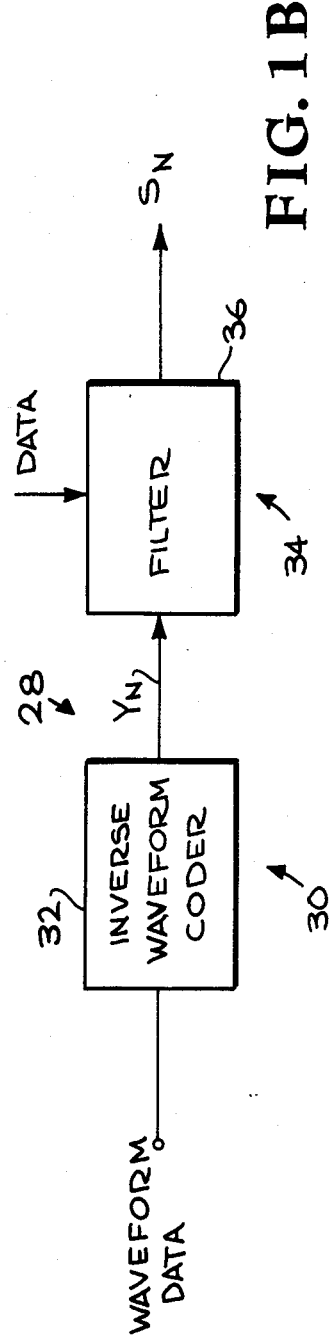
Fig. 1B is another simplified block diagram used to explain the signal decoding principles of the present invention.

FIG. 1B illustrates an apparatus 28 for describing the general decoding principles of the present invention to reconstruct the original signal $S_N$. Apparatus 28 includes means 30 for inverse waveform coding the above-mentioned waveform coding data to produce the coded signal $Y_N$ having the distortion. Means 30 preferably includes an inverse ADPCM waveform coder 32 operating at a low bit rate $\leq 16k$ bits per second, such as 4.4k or 8.7k bits per second. Apparatus 10 also includes means 34 for attenuating the distortion in the coded signal $Y_N$ in response to certain data, e.g., the above-mentioned filter coefficient data. The output of attenuating means 34 is the reconstructed original signal $S_N$. Preferably, means 34 includes an adaptive spectral shaping filter 36.

Figure 2A:
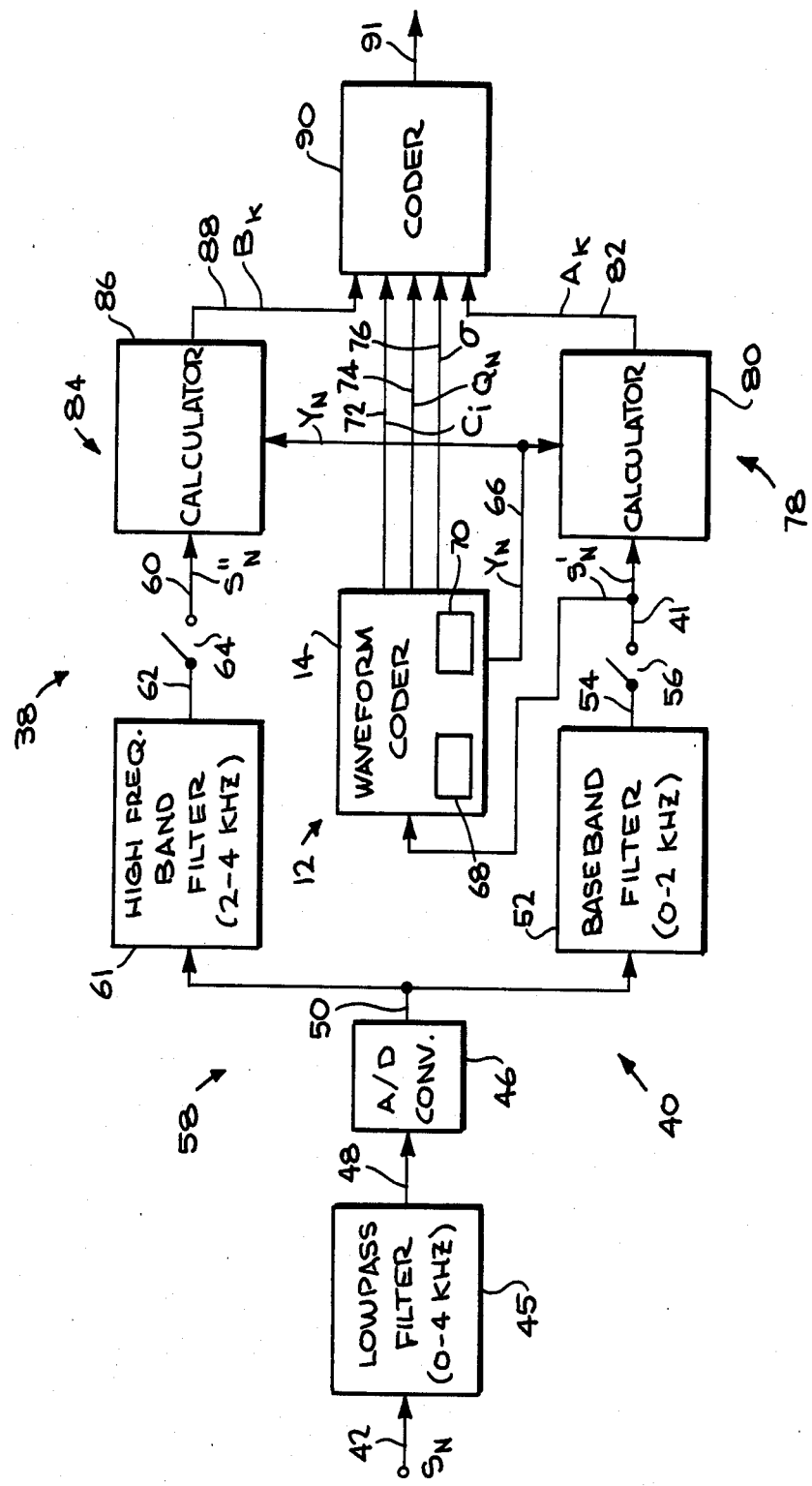
FIG. 2A is a block diagram of one embodiment of a signal analyzer of the present invention.

FIG. 2A illustrates an overall apparatus 38 for analyzing the analog speech signal $S_N$ using the principles described in connection with the coding apparatus 10 shown in FIG. 1. The apparatus 38 includes means shown generally at 40 for low frequency filtering the analog speech signal $S_N$ received on an input line 42 to produce a signal $S_N'$ on a line 44. Means 40 includes a lowpass filter 45 for filtering the signal $S_N$ in the range of 0-4 kHz. An analog-to-digital (A/D) converter 46 receives the filtered analog signal over a line 48 and outputs digital signals at a sampling frequency $f_s$, e.g., 8 kHz, over a line 50. A baseband filter 52 in the range of 0-2 kHz filters the digital signals on line 50 and outputs these signals on a line 54. An on-off switch 56, operative at a frequency $f_s/2$, selects alternate samples of the digital signals on line 54 to produce signal $S_N'$ on line 44, whereby fewer digital signals have to be further processed.

Apparatus 38 also includes means shown generally at 58 for high frequency filtering the analog speech signal $S_N$ on line 42 to produce a signal $S_N''$ on a line 60. Means 58 includes the lowpass filter 45 and the A/D converter 46, together with a high frequency band filter 61 in the range of 2-4 kHz for filtering the digital signals on line 50 and outputting these signals on a line 62. An on-off switch 64, which also operates at frequency $f_s/2$, selects alternate samples of the digital signals on line 62 to produce signal $S_N''$ on line 60, whereby fewer digital signals have to be further processed.

The apparatus 38 also has the waveform coding means 12, described in connection with Fig. 1, which responds to the signal $S_N'$ on line 44 to produce the coded signal $Y_N$ on a line 66. The waveform coding means 12 can be, for example, the ADPCM waveform coder 14 which produces the coded signal $Y_N$ using a quantizer 68 and a filter 70 having filter coefficients. The ADPCM waveform coder 14 also outputs the above-mentioned waveform coding data on a line 72, a line 74 and a line 76, respectively. The data on line 72 identifies the values $C_i$ of the filter coefficients of filter 70, the data on line 74 identifies the quantization values $Q_N$ for quantizing the signal $S_N'$, and the data on line 76 is the quantization step size $\sigma$ for quantizing the signal $S_N'$ one frame time. The ADPCM waveform coder 14, in accordance with the present invention, is operated at low bit rates, e.g., 4.4k or 8.7k bits per second, to introduce quantization noise or distortion into the coded signal $Y_N$ on line 66.

Apparatus 38 has a means 78 for determining the above-mentioned filter coefficient data, described in connection with FIG. 1, in response to the signal $S_N'$ on line 44 and the coded signal $Y_N$ on line 66. The determining means 78 includes a calculator 80 which calculates the filter coefficient values $A_K$ using equation 6, but where $R_{YS}$ is replaced by $R_{YS'}$ corresponding to signal $S_N'$. That is, calculator 80 determines the auto-correlation components $R_{YY}$ of the coded signal $Y_N$ on line 66 and the cross-correlation components $R_{YS'}$ of the coded signal $Y_N$ on line 66 and the signal $S_N'$ on line 44 to calculate the values $A_K$, which are then outputted on a line 82.

Similarly, apparatus 38 has a means 84 for determining filter coefficient data in accordance with equation 6 in response to the signal $S_N''$ on line 60 and the coded signal $Y_N$ on line 66. The determining means 84 includes a calculator 86 which calculates filter coefficient values $B_K$ (instead of $A_K$) using equation 6 and where $R_{YS}$ is replaced by $R_{YS''}$ corresponding to signal $S_N''$. That is, calculator 86 determines the auto-correlation components $R_{YY}$ of the coded signal $Y_N$ on line 66 and the cross-correlation components $R_{YS''}$ of the coded signal $Y_N$ on line 66 and the signal $S_N''$ on line 60 to calculate the values $B_K$, which are then outputted on a line 88.

Preferably, a digital coder 90 then codes the filter coefficient values $C_i$ on line 72, the quantization data $Q_N$ on line 74, the quantizer step size $\sigma$ on line 76, the filter coefficient values $A_K$ on line 82 and the filter coefficient values $B_K$ on line 88 and outputs all this coded data on a data line 91. At this point on line 91, the data can be stored in a memory (not shown) for later reconstruction of the original signal $S_N$ or be transmitted over a communication link to a receiver (not shown) for currently reconstructing the original signal $S_N$.

The coder 90 can encode the filter coefficient values $A_K$ on line 82 and the filter coefficient values $B_K$ on line 88 with different numbers of bits. For example, the data on line 82 are coded with 10 bits, while the data on line 88 are coded with 16 bits. This is because the baseband filtered signal $S_N'$ on line 44 has samples that are more correlated to one another, whereas the high frequency filtered signal $S_N''$ on line 60 has less correlated samples. Therefore, fewer bits are required to code the filter coefficient values $A_K$ on line 82 than the filter coefficient values $B_K$ on line 88. The data rate on line 91 can be, for example, 4.8k or 9.6k bits per second.

Figure 2B:
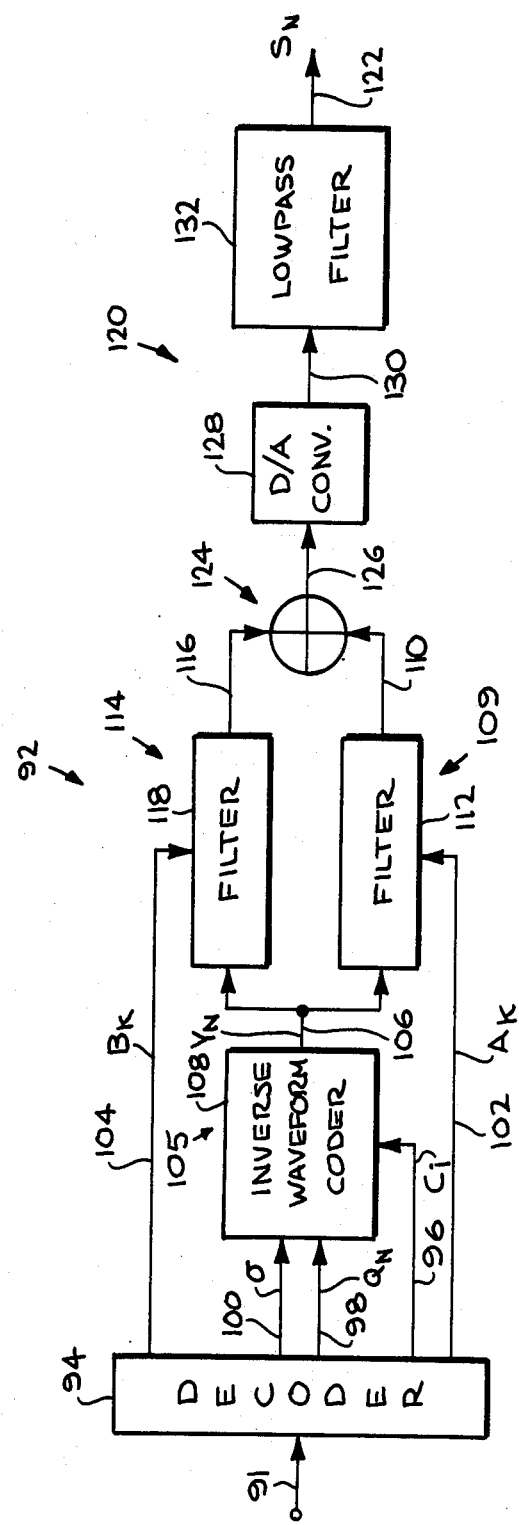
FIG. 2B is a block diagram of one embodiment of a signal synthesizer of the present invention.

FIG. 2B shows an apparatus 92 for synthesizing the analog speech signal $S_N$ that was analyzed using the apparatus 38 of FIG. 2A. A decoder 94 receives and decodes the data on line 91 to produce the filter coefficient values $C_i$ on a line 96, the quantization data $Q_N$ on a line 98, the quantizer step size $\sigma$ on a line 100, the filter coefficient values $A_K$ on a line 102 and the filter coefficient values $B_K$ on a line 104. An inverse waveform coding means 105 responds to the filter coefficient values $C_i$ on line 96, the quantization values $Q_N$ on line 98 and the quantizer step size $\sigma$ on line 100 to produce the coded signal $Y_N$ on a line 106. Means 105 preferably is an inverse ADPCM waveform coder 108 operating at the low bit rate of, e.g., 4.4k or 8.7k bits per second. The coded signal $Y_N$ on line 106 has the quantization noise or distortion mentioned above.

The synthesizing apparatus 92 also includes means 109 for attenuating the quantization noise or distortion in the coded signal $Y_N$ on line 106 to produce undistorted output signals on a line 110. Means 109 includes an adaptive lowband spectral shaping filter 112 whose filter coefficients are adaptively set with the filter coefficient values $A_K$ on line 102. Another means 114 attenuates the distortion in the coded signal $Y_N$ on line 106 to produce undistorted output signals on a line 116. Means 114 includes an adaptive highband spectral shaping filter 118 whose filter coefficients are adaptively set at the values $B_K$ of the filter coefficients on line 104.

Also shown generally at 120 is a means for combining the output signals on line 110 and the output signals on line 116 to produce the original analog speech signal $S_N$ on an output line 122. Means 120 includes means 124 for alternately outputting on a line 126 the signals on line 110 and the signals on line 116, a D/A converter 128 which produces an analog signal on a line 130 in response to the signals on line 126, and a lowpass filter 132 which filters the analog signal on line 130 to produce the original speech signal $S_N$ on line 122.

As described above, the speech analyzer apparatus 38 and the speech synthesizer apparatus 92, in addition to the waveform data $C_i$, $Q_N$ and $\sigma$, utilize the filter coefficient data $A_K$, $B_K$ to reconstruct the analog speech signal $S_N$. As will now be described in connection with the embodiments of FIG. 3A and FIG. 3B, as an alternative to transmitting or storing the filter coefficient data $A_K$, $B_K$, the cross-correlation components $R_{YS}$ (see equation 11) are transmitted or stored for analysis and synthesis of the analog speech signal $S_N$.

Figure 3A:
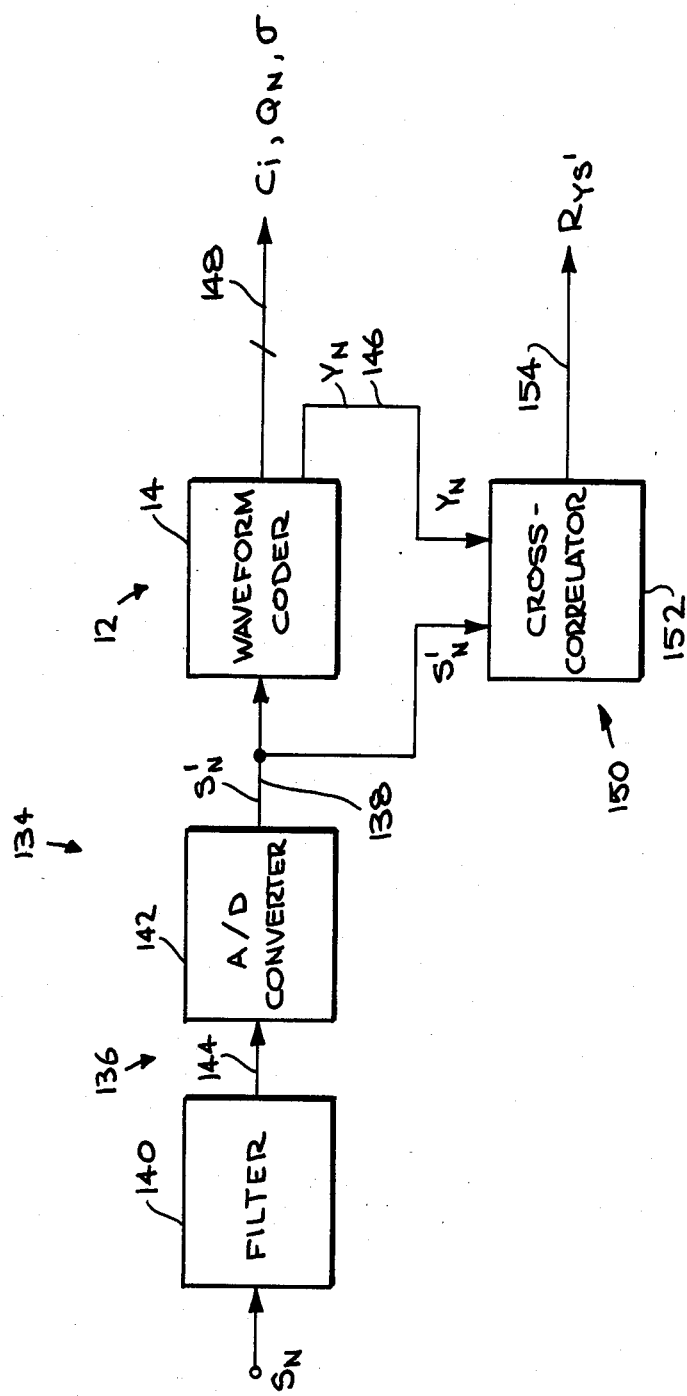
FIG. 3A is a block diagram of another embodiment of a signal analyzer of the present invention.

FIG. 3A shows an apparatus 134 for anlyzing the analog speech signal $S_N$. The apparatus 134 includes means 136 for filtering and A/D converting the signal $S_N$ to produce a filtered output signal $S_N'$ on a line 138. Means 136 includes an anti-aliasing filter 140 and an A/D converter 142 which converts the filtered signal on a line 144 to produce the signal $S_N'$ on the line 138. Then, the waveform coding means 12 described in connection with FIG. 1 produces the coded signal $Y_N$ having distortion on a line 146 in response to the signal $S_N'$ on line 138. As previously indicated, means 12 can be an ADPCM waveform coder 14 which outputs the waveform coding data, i.e., the filter coefficient values $C_i$, the quantization values $Q_N$ and the quantization step size $\sigma$ on three respective lines shown generally at 148.

Apparatus 134 also includes means 150 for cross-correlating the signal $S_N'$ on line 138 and the coded signal $Y_N$ on line 146. Means 150 includes a cross-correlator 152 for producing values of the cross-correlation components $R_{YS'}$ that are outputted digitally on a line 154. Thus, apparatus 134 analyzes the analog speech signal $S_N$ and produces data in the form of waveform coding data $C_i$, $Q_N$ and $\sigma$, and data in the form of the values of the cross-correlation components $R_{YS'}$ to reconstruct the signal $S_N$. The data on lines 148 and on line 154 can be stored in a memory (not shown) for later use or can be transmitted over a communications link (not shown) for synthesis by a receiver (not shown).

Figure 3B:
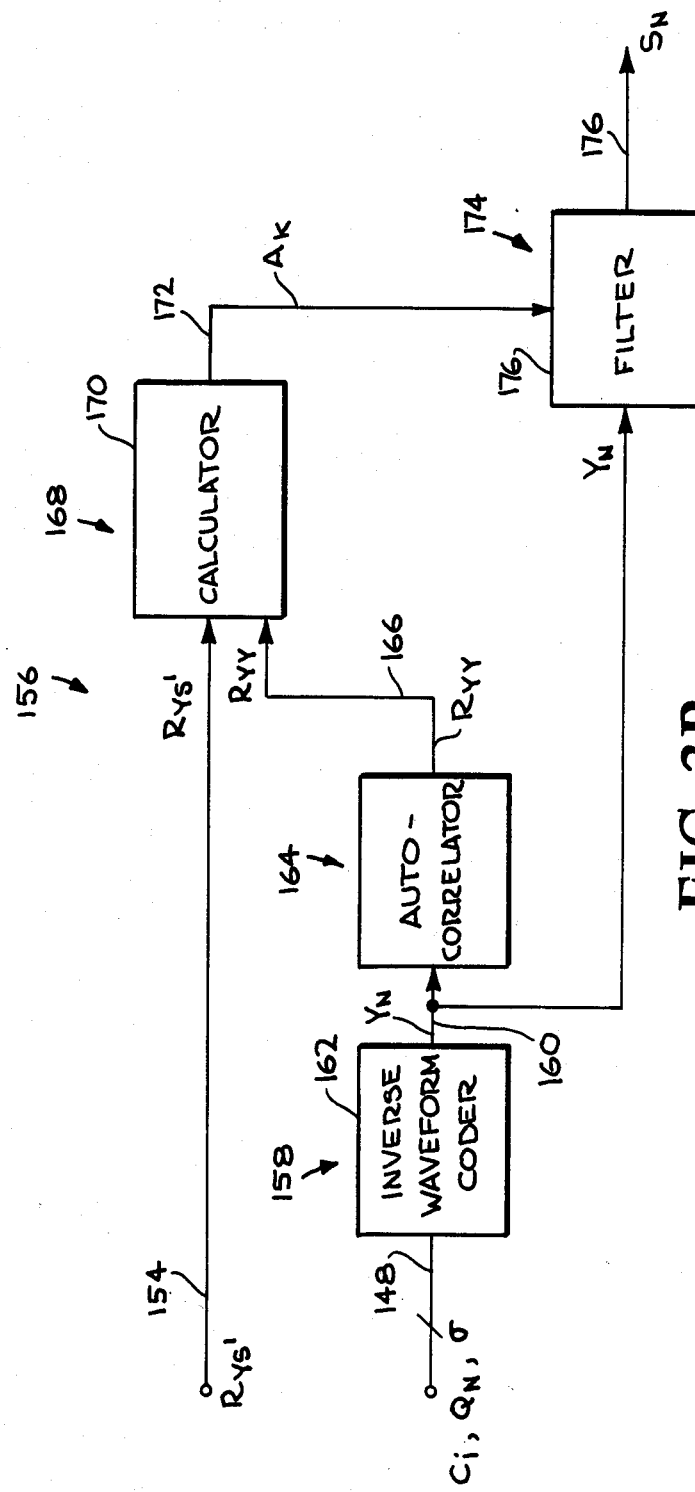
FIG. 3B is a block diagram of another embodiment of a signal synthesizer of the present invention.

FIG. 3B illustrates an apparatus 156 for synthesizing the analog speech signal $S_N$. Synthesizing apparatus 156 includes means 158 for inverse waveform coding the waveform coding data $C_i$, $Q_N$ and $\sigma$ on lines 148 to produce the coded signal $Y_N$ having distortion on a line 160. Means 158 preferably is an inverse ADPCM waveform coder 162. A means 164 for auto-correlating the coded signal $Y_N$ on line 160 then outputs digitally the values of the auto-correlation components $R_{YY}$ on a line 166. Synthesizing apparatus 156 also includes means 168 for determining the values $A_K$ of filter coefficients in response to the values of the cross-correlation components $R_{YS'}$ on line 154 and the auto-correlation components $R_{YY}$ on line 166. Means 168 includes a calculator 170 which calculates the values $A_K$ in accordance with equation 6, where $R_{YS}$ is replaced by $R_{YS'}$ to correspond to signal $S_N$, and outputs values $A_K$ on a line 172.

Apparatus 156 also includes adaptive filter means 174 for filtering the distortion in the coded signal $Y_N$ on line 160 to output the synthesized analog speech signal $S_N$ on a line 176. Means 174 includes an adaptive spectral shaping filter 176 whose filter coefficients are set adaptively with the values $A_K$ on line 172 to filter the coded signal $Y_N$.

The foregoing description of a preferred embodiment of the invention has been presented for purposes of illustration and desecription. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. Apparatus for coding an original signal having a waveform, comprising:
   (a) means for coding the waveform at a rate to produce a coded signal having distortion; and
   (b) means, responsive to the coded signal, for attenuating said distortion, said waveform coding means having first data and said attenuating means having second data for reconstructing the original signal.

2. Apparatus, according to claim 1, wherein said means for attenuating comprises means for filtering said coded signal.

3. Apparatus, according to claim 2, wherein said means for filtering comprises a filter having filter coefficients having values being said second data.

4. Apparatus, according to claim 1, wherein said means for attenuating comprises adaptive means for filtering said coded signal.

5. Apparatus, according to claim 4, wherein said adaptive means comprises:
   (a) an adaptive filter, having filter coefficients having values being said second data, for outputting a filtered signal in response to said coded signal; and
   (b) means for producing an error signal in response to the original signal and said filtered signal; said values of said filter coefficients being varied in response to said error signal to minimize said distortion.

6. Apparatus, according to claim 1, wherein said means for coding the waveform comprises a waveform coder operative at a low bit rate.

7. Apparatus, according to claim 6, wherein said waveform coder is a pulse code modulation system.

8. Apparatus, according to claim 7, wherein said pulse code modulation is an adaptive differential pulse code modulation system.

9. Apparatus for decoding a data signal having information for reconstructing an original signal, the data signal including first data and second data, comprising:
   (a) means for inverse waveform coding the first data to produce a coded signal having distortion; and
   (b) means, responsive to the second data, for attenuating said distortion to reconstruct the original signal.

10. Apparatus, according to claim 9, wherein said means for attenuating comprises means for filtering said coded signal.

11. Apparatus, according to claim 10, wherein said means for filtering comprises an adaptive filter having filter coefficients having values being varied in response to the second data.

12. Apparatus, according to claim 9, wherein said means for inverse waveform coding comprises an inverse waveform coder operative at a low bit rate.

13. Apparatus, according to claim 12, wherein said inverse waveform coder is a pulse code modulation system.

14. Apparatus for analyzing an original signal, comprising:
   (a) means for low frequency filtering the original signal to produce a first signal having a waveform;
   (b) means for high frequency filtering the original signal to produce a second signal;
   (c) means for coding said waveform at a rate to produce a coded signal having distortion, said waveform coding means having first waveform data to reconstruct the original signal;
   (d) first means, responsive to said first signal and said coded signal, for determining second filter coefficient data to minimize said distortion and to reconstruct the original signal;
   (e) second means, responsive to said second signal and said coded signal, for determining third filter coefficient data to minimize said distortion and to reconstruct the original signal; and
   (f) means for coding said first waveform data, said second filter coefficient data and said third filter coefficient data.

15. Apparatus, according to claim 14, wherein said means for coding said waveform comprises a waveform coder operative at a low bit rate.

16. Apparatus, according to claim 15, wherein said waveform coder comprises an adaptive differential pulse code modulation system.

17. Apparatus, according to claim 14, wherein said first means for determining comprises means for calculating said second filter coefficient data in accordance with the equation:

$$R_{YY}A = R_{YS'}$$

where $R_{YY}$ are auto-correlation components of said coded signal, where $R_{YS'}$ are cross-correlation components of said coded signal and said first signal, and where A are values of said second filter coefficient data.

18. Apparatus, according to claim 14, wherein said second means for determining comprises means for calculating said third filter coefficient data in accordance with the equation:

$$R_{YY}B = R_{YS''}$$

where $R_{YY}$ are auto-correlation components of said coded signal, where $R_{YS''}$ are cross-correlation components of said coded signal and said second signal, and where B are values of said third filter coefficient data.

19. Apparatus, according to claim 14, wherein said means for coding said first waveform data, said second filter coefficient data and said third filter coefficient data digitally codes said second filter coefficient data and said third filter coefficient data with different numbers of bits.

20. Apparatus, according to claim 19, wherein said third filter coefficient data is digitally coded with a higher number of bits than said second filter coefficient data.

21. Apparatus, according to claim 14, wherein the original signal is an analog signal and wherein said means for low frequency filtering the original signal comprises:
   (a) means for lowpass filtering the original signal;
   (b) means for analog-to-digital converting the lowpass filtered original signal to produce digital signals;

(c) means for baseband filtering the digital signals; and (d) means for selecting every other of the baseband filtered digital signals.

22. Apparatus, according to claim 14, wherein the original signal is an analog signal and wherein said means for high frequency filtering the original signal comprises:

(a) means for lowpass filtering the original signal;

(b) means for analog-to-digital converting the lowpass filtered original signal to produce digital signals;

(c) means for high frequency band filtering the digital signals; and (d) means for selecting every other of the high frequency band filtered digital signals.

23. Apparatus, according to claim 14, further comprising means for synthesizing the original signal in response to said first waveform data, said second filter coefficient data and said third filter coefficient data.

24. Apparatus for synthesizing an original signal in response to first waveform data, second filter coefficient data corresponding to a baseband frequency of the original signal and third filter coefficient data corresponding to a high frequency band of the original signal, comprising:

(a) means for inverse waveform coding the first waveform data to produce a coded signal having distortion;

(b) first filter means, responsive to said coded signal and the second filter coefficient data, for attenuating said distortion to output first non-distorted signals;

(c) second filter means, responsive to said coded signal and the third filter coefficient data, for attenuating said distortion to output second non-distorted signals; and (d) means for combining said first non-distorted signals and said second non-distorted signals to reconstruct the original signal.

25. Apparatus, according to claim 24, wherein said means for inverse waveform coding comprises an inverse waveform coder.

26. Apparatus, according to claim 25, wherein said inverse waveform coder is an adaptive pulse code modulation system.

27. Apparatus, according to claim 24, wherein each of said first filter means and said second filter means comprises an adaptive filter.

28. Apparatus, according to claim 24, wherein said first and second non-distorted signals are digital, and wherein said means for combining comprises:

(a) means for alternately outputting said first and second digital non-distorted signals;

(b) means, coupled to said outputting means, for digital-to-analog converting the outputted digital signals to produce analog signals; and (c) means, coupled to said digital-to-analog converting means, for lowpass filtering the analog signals.

29. Apparatus for analyzing an original analog signal, comprising:

(a) means for filtering and analog-to-digital converting the original signal to produce a first signal having a waveform;

(b) means for coding said waveform at a rate to produce a coded signal having distortion, said waveform coding means having first waveform data; and (c) means for cross-correlating said first signal and said coded signal to produce second cross-correlation data, said first waveform data and said second cross-correlation data having information for reconstructing the original signal.

30. Apparatus, according to claim 29, wherein said means for coding said waveform comprises a waveform coder.

31. Apparatus, according to claim 30, wherein said waveform coder is operative at a low bit rate.

32. Apparatus, according to claim 29, wherein said means for filtering comprises:

(a) a filter for filtering the original signal; and (b) an analog-to-digital converter coupled to said filter.

33. Apparatus, according to claim 29, further comprising means for synthesizing the original signal in response to said first waveform data and said second cross-correlation data.

34. Apparatus for synthesizing an original signal in response to first waveform data and second cross-correlation data having information about the original signal, comprising:

(a) means for inverse waveform coding the first waveform data to produce a coded signal having distortion;

(b) means for auto-correlating said coded signal to produce third auto-correlation data;

(c) means for determining fourth filter coefficient data in response to said second cross-correlation data and said auto-correlation data; and (d) filter means, responsive to said fourth filter coefficient data, for filtering said distortion of said coded signal.

35. Apparatus, according to claim 34, wherein said means for inverse waveform coding comprises an inverse adaptive digital pulse code modulation system.

36. Apparatus, according to claim 34, wherein said means for determining comprises means for calculating said fourth filter coefficient data in accordance with the equation:

$$R_{YY}A = R_{YS}$$

where $R_{YY}$ are auto-correlation components of said coded signal, where $R_{YS}$ is said second cross-correlation data, and where A are values of said fourth filter coefficient data.

37. Apparatus, according to claim 34, wherein said filter means comprises an adaptive filter having filter coefficients having values being varied in response to said fourth filter coefficient data.

38. A method of coding an original signal having a waveform, comprising:

(a) coding the waveform at a rate to produce a coded signal having distortion;

(b) providing first waveform coding data in response to the coding;

(c) attenuating the distortion of the coded signal; and (d) providing second attenuation data in response to the attenuating, the first waveform coding data and the second attenuation data having information to reconstruct the original signal.

39. A method, according to claim 38, wherein the step of attenuating comprises filtering the coded signal with a filter.

40. A method, according to claim 39, wherein the step of filtering is adaptive.

41. A method, according to claim 39, wherein the second attenuation data are values of filter coefficients of the filter.

42. A method, according to claim 38, wherein the step of coding occurs at a low bit rate.

43. A method of decoding a data signal having information for reconstructing an original signal, the data signal including first data and second data, comprising:
   (a) inverse waveform coding the first data to produce a coded signal having distortion; and
   (b) attenuating the distortion of the coded signal in response to the second data to reconstruct the original signal.

* * * * *